United States Patent
Krondorfer et al.

(10) Patent No.: US 12,278,510 B2
(45) Date of Patent: Apr. 15, 2025

(54) CHARGE ADAPTER FOR POWER TOOLS

(71) Applicant: Emerson Professional Tools, LLC., Elyria, OH (US)

(72) Inventors: Harald Krondorfer, Aurora, OH (US); Naga Penmetsa, Westlake, OH (US)

(73) Assignee: Emerson Professional Tools, LLC, Elyria, OH (US)

( * ) Notice: Subject to any disclaimer, the term of this patent is extended or adjusted under 35 U.S.C. 154(b) by 696 days.

(21) Appl. No.: 17/557,593

(22) Filed: Dec. 21, 2021

(65) Prior Publication Data

US 2022/0200300 A1 Jun. 23, 2022

Related U.S. Application Data

(60) Provisional application No. 63/128,914, filed on Dec. 22, 2020.

(51) Int. Cl.
| | |
|---|---|
| *H01M 10/46* | (2006.01) |
| *B25F 5/02* | (2006.01) |
| *H02J 7/00* | (2006.01) |
| *H02J 7/02* | (2016.01) |

(52) U.S. Cl.
CPC .............. *H02J 7/0044* (2013.01); *B25F 5/02* (2013.01); *H02J 7/0013* (2013.01); *H02J 7/0045* (2013.01); *H02J 7/02* (2013.01)

(58) Field of Classification Search
CPC .......... H02J 7/02; H02J 7/0013; H02J 7/0042; H02J 7/0044; H02J 7/0045; B25F 5/02
USPC ......................... 320/107, 114, 115
See application file for complete search history.

(56) References Cited

U.S. PATENT DOCUMENTS

| | | | |
|---|---|---|---|
| 6,876,173 B2 | 4/2005 | Mastaler et al. | |
| 9,634,503 B2 | 4/2017 | Taga et al. | |
| 10,439,415 B2 | 10/2019 | Zhu et al. | |
| 2002/0125857 A1 | 9/2002 | Mastaler et al. | |
| 2003/0090239 A1 | 5/2003 | Sakakibara | |
| 2013/0334898 A1* | 12/2013 | Kao | H02M 7/02 307/151 |
| 2014/0117922 A1 | 5/2014 | Pham | |
| 2014/0151079 A1 | 6/2014 | Furui et al. | |
| 2015/0318732 A1 | 11/2015 | Heine et al. | |
| 2018/0019611 A1 | 1/2018 | Zhang et al. | |
| 2018/0158318 A1 | 6/2018 | Huggins et al. | |
| 2018/0294662 A1 | 10/2018 | Polakowski et al. | |
| 2018/0337540 A1 | 11/2018 | Taga | |
| 2020/0161607 A1 | 5/2020 | Penmetsa et al. | |

(Continued)

FOREIGN PATENT DOCUMENTS

| | | |
|---|---|---|
| AU | 2019101121 A | 10/2019 |
| WO | WO2019144265 A | 8/2019 |

OTHER PUBLICATIONS

Battery Charger, EGO Power + 56 V Charger Manual, available from EGO Power; Dec. 20, 2021; 60 pages.

(Continued)

*Primary Examiner* — Edward Tso
(74) *Attorney, Agent, or Firm* — Erik J. Overberger; RANKIN, HILL & CLARK LLP

(57) ABSTRACT

Charge adapters for use with batteries and AC power adapters are described. Also described are systems and related methods using the charge adapters and particularly tool systems with detachable batteries.

33 Claims, 14 Drawing Sheets

(56) References Cited

U.S. PATENT DOCUMENTS

2020/0301696 A1   9/2020  Yang et al.

OTHER PUBLICATIONS

Battery Charger, 72V Manual, available from Milwaukee Electric; Dec. 20, 2021; 16 pages.
Battery Charger, 20V Specification, available from Dewalt; Dec. 20, 2021; 10 pages.
AC Power Adapter, Ridgid 44468 120 VAC Power Adapter Specification, Available from Emerson Professional Tools; Dec. 20, 2021; 2 pages.
AC Power Adapter, NG2 Mains Adapter 18V for 120V or 230V Mains Voltage, available from Klauke; Dec. 20, 2021; 2 pages.
International Search Report and Written Opinion dated May 4, 2022; Application No. PCT/US21/64521; 16 pages.

\* cited by examiner

CHARGE ADAPTER FOR POWER TOOLS

CROSS REFERENCES TO RELATED APPLICATIONS

This application claims priority on U.S. provisional application Ser. No. 63/128,914 filed Dec. 22, 2020.

FIELD

The present subject matter relates to charge adapters, systems using such charge adapters, and particularly tool systems, including related methods.

BACKGROUND

Battery powered tools are commonly used by industrial and commercial users, tradespeople and homeowners. In most applications, a battery pack that is separable from the tool and that contains a plurality of individual battery cells is provided. The separable battery pack has an advantage over non-removable or integrated battery packs, in that a depleted battery pack can be charged on a separate battery charger while the tool can still be used with a charged, second battery pack.

For some applications involving extended, uninterrupted use, a battery pack is discharged at a higher rate than another substitute battery pack can be recharged. For applications requiring uninterrupted use over extended time periods, a power adapter is typically used. Such a power adapter has essentially the same battery interface as that of the battery, in order to connect correctly to the tool. Such a power adapter typically has a power cord that can be connected to an AC mains outlet, as shown in FIG. 1. FIG. 1 shows a known power tool system 1 with a power tool 10, one or more batteries 20, a charger 30, and a power adapter 40. Such power tool 10 may include at least one extension 13, and an interface 15, for connecting to such a power adapter 40. A known charger 30 may also include at least one extension 33, and an interface 35, for such a purpose. While using the power adapter 40 with the tool 10, the user trades the convenience of cordless tool operation against the ability of extended uninterrupted use, while still being able to utilize the same tools.

Battery chargers such as the charger 30 depicted in FIG. 1, commonly include an interface to connect with a battery, a power supply and/or converter to connect to AC mains and to generate a DC power output, and control circuitry to control the output power provided to the battery. For example, many Li-Ion batteries require a certain charging regiment known as constant current-constant voltage (CC-CV), depending on the charge condition of the battery pack. The charge control circuitry monitors the charge condition of the battery, the temperature of the battery, and regulates the charging current and charging voltage to the battery accordingly.

FIG. 2 shows a known AC power adapter 40 for extended tool use. The power adapter 40 includes an interface 42 to connect with the tool such as tool 10 shown in FIG. 1, and a power supply 44 to connect to AC mains and to generate a DC power output. Known power adapters 40 often include slots 46 to facilitate alignment of an interface (such as interface 15 of power tool 10 or interface 35 of charger 30) with interface 42 of known power adapters 40, for quick operative connection of these components. Typically, the DC power output capabilities of the power supply 44 in the power adapter 40 are greater than the output capabilities of a power supply in a corresponding charger such as charger 30 shown in FIG. 1. The reason for the more powerful power supply 44 in the power adapter 40 is due to the higher power demand of such a tool, as represented by known tool 10, when compared to the maximum power that batteries such as batteries 20 shown in FIG. 1 can accept for charging.

Although the current state of the art is satisfactory in many respects, there is a need by professionals using power tools for a charge adapter design configuration that enables a user to connect to a power adapter and a battery pack simultaneously.

SUMMARY

The difficulties and drawbacks associated with previous approaches are addressed in the present subject matter as follows.

In one aspect, the present subject matter provides a charge adapter comprising a first interface for engagement and electrical connection with a battery, and a second interface for engagement and electrical connection with a component. The charge adapter is releasably separable from the battery via the first interface and releasably separable from the component via the second interface.

In another aspect, the present subject matter provides a system for charging a battery. The system comprises a charge adapter including an interface for engagement and electrical connection with a battery. The system also comprises a power adapter releasably separable from the charge adapter. The power adapter includes provisions to electrically connect the power adapter to the charge adapter, and a power supply for converting AC electrical power to DC electrical power. The charge adapter is free of a power supply.

In yet another aspect, the present subject matter provides a system comprising a charge adapter including a first interface for engagement and electrical connection with a battery, and a second interface. The system also comprises at least one of (i) a battery and (ii) a power adapter. The at least one of the battery and the power adapter is releasably separable from the charge adapter.

In still another aspect, the present subject matter provides a tool system comprising an electrically powered tool including an interface for engagement and electrical connection with at least one of (i) a battery and (ii) a power adapter. The at least one of the battery and the power adapter is releasably separable from the tool. The system also comprises a charge adapter including an interface for engagement and electrical connection with a battery and a second interface for connection with the power adapter.

In yet another aspect, the present subject matter provides a method of charging a battery. The method comprises providing a charge adapter, a battery, and a power adapter. The charge adapter includes an indicator and provisions for connecting the battery to the charge adapter and provisions for connecting the power adapter to the charge adapter. The method also comprises connecting one of the battery and the power adapter to the charge adapter. The method further comprises connecting the other of the battery and the power adapter to the charge adapter. The method also comprises determining the connections of the battery and the power adapter relative to the charge adapter. If the battery and the power adapter are not properly connected to the charge adapter, the method comprises actuating the indicator to indicate an error state. If the battery and the power adapter are properly connected to the charge adapter, the method comprises actuating the indicator to indicate a charge state.

In still another aspect, the present subject matter provides a charge adapter comprising a first interface, a second interface, and circuitry for controlling direction of flow of electrical power between the first interface and the second interface.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The power supplies in conventional battery chargers and in conventional AC power adapters are the main cost drivers for these units. The present subject matter addresses these cost issues by eliminating the duplicate power supplies. Thus in one aspect, the present subject matter provides a power tool system that utilizes the power supply in a power adapter for also charging batteries. The term "power supply" as used herein refers to a component or subcomponent that converts AC electrical power to DC electrical power. The component or subcomponent typically also provides the DC electrical power at a voltage that is less than the voltage of the AC electrical power. These aspects are all described in greater detail herein.

Figure 3:
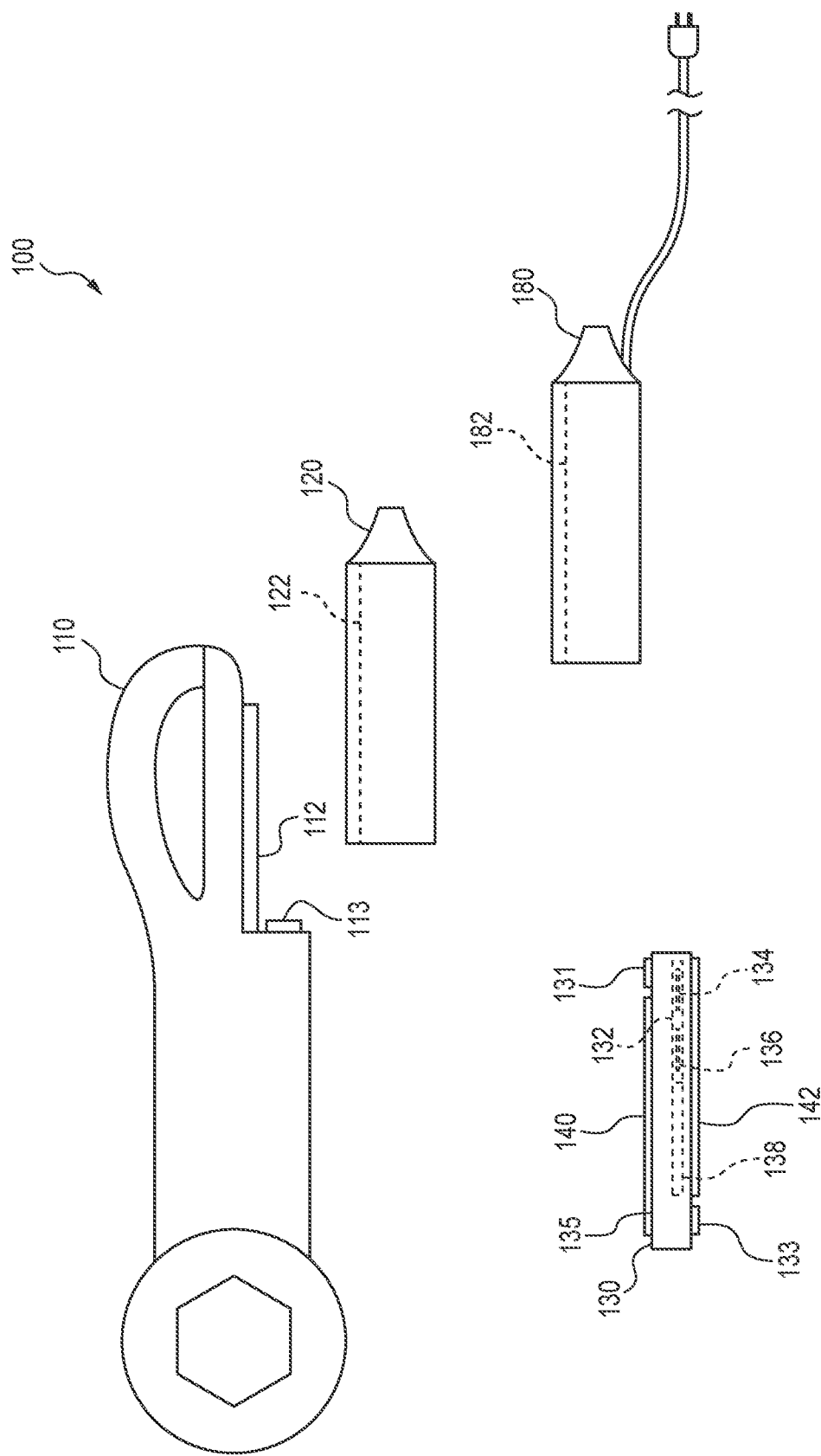
FIG. 3 illustrates an embodiment of a power tool system in accordance with the present subject matter.

FIG. 3 illustrates an embodiment of a power tool system 100 in accordance with the present subject matter. The power tool system 100 comprises one or more power tools 110, one or more batteries 120, a power adapter 180 for extended use, and a charge adapter 130. The term "battery" as used herein includes one or more batteries, and includes one or more battery packs as known in the tool industry. For example, the term "battery" may refer to a battery pack which includes a plurality of batteries or battery cells housed within an enclosure with circuitry and/or electrical contacts for transferring electrical power to or from the internal batteries or cells. Power tool 110 includes at least one extension 113 (preferably four) for connecting to other components of system 100. Such components are releasably separable and engageable with each other in particular configurations and/or combinations as described in detail herein. The term "releasably separable" as used herein refers to a configuration in which one component is configured to be selectively physically engaged with another component and then selectively physically disengaged or separated from the other component. Also, the thus-engaged components are also configured to be in electrical connection with each other. Specifically, the tool 110 is releasably separable with the battery 120 or the power adapter 180. The battery 120 is releasably separable from the tool 110 and/or the charge adapter 130. The charge adapter 130 is releasably separable from the battery 120 and/or the power adapter 180. And the power adapter 180 is releasably separable from the tool 110 and/or the charge adapter 130. All of these components and their operation, when operatively engaged, are described in greater detail herein.

In many embodiments, the charge adapter 130 includes control circuitry 132 including a microprocessor 134 and field effect transistors 136 (also known as metal oxide silcon field effect transistors or metal oxide semiconductor field effect transistors or MOSFET's) to control the output power to the battery 120. For battery charging, the charge adapter 130 is placed between and connected to the power adapter 180 and the battery 120. The charge adapter 130 is configured to control the power, i.e., charging current and voltage, provided to the battery 120 from the power adapter 180. The charge adapter 130 includes interface(s) 140 and 142 (described below) to engage and provide electrical connection with the battery 120 and/or the power adapter 180. The battery 120 includes an interface 122 configured to engage and provide electrical connection with the tool 110 or the charge adapter 130. The power adapter 180 also includes an interface 182 configured to engage and provide electrical connection with the tool 110 or the charge adapter 130.

The battery 120 and the power adapter 180 utilize the same or substantially the same geometric configuration for each respective interface 122, 182, as they both need to interface with the power tool 110. In many embodiments, the interface 122 of the battery and the interface 182 of the power adapter 180 exhibit the same geometric configuration. In many embodiments, a housing 135 of the charge adapter 130 includes two interfaces 140 and 142, preferably located on opposite sides of the housing 135, which are configured to be the same or substantially the same as a corresponding interface 112 on the tool 110. In particular versions, the interfaces 140 and 142 are oppositely directed from each other. The term "oppositely directed" as used herein refers to an orientation of the two interfaces in which they are directed generally opposite from one another. The interface 140 is configured to engage and provide electrical connection to the battery 120, and the interface 142 is configured to engage and provide electrical connection to the power adapter 180. These aspects are shown in FIG. 3.

It will be understood that interfaces 140, 142 of the charge adapter 130 and interfaces 122, 182 of the battery 120 and the power adapter 180, respectively, are of opposite mated surface portions. Thus, the interfaces 140, 142 fittingly engage the interfaces 122, 182, and vice versa. Furthermore, the tool interface 112 and the battery and AC power adapter interfaces 122, 182 are also of opposite mated surface portions such that the battery 120 and AC power adapter interfaces 122, 182 fittingly engage the tool interface 112, and vice versa. It will be understood that the present subject matter includes a wide array of shapes, sizes, configurations, and/or arrangements for the interfaces 112, 122, 140, 142, and 182. In one embodiment, the interfaces that fittingly engage each other include projection(s) and corresponding recess(es) that are accessible along exterior regions of the interfacing components. Such an embodiment is an example of oppositely mated also referred to herein as configured to provide interfitting, surface portions. These aspects are described in greater detail herein.

Figure 4:
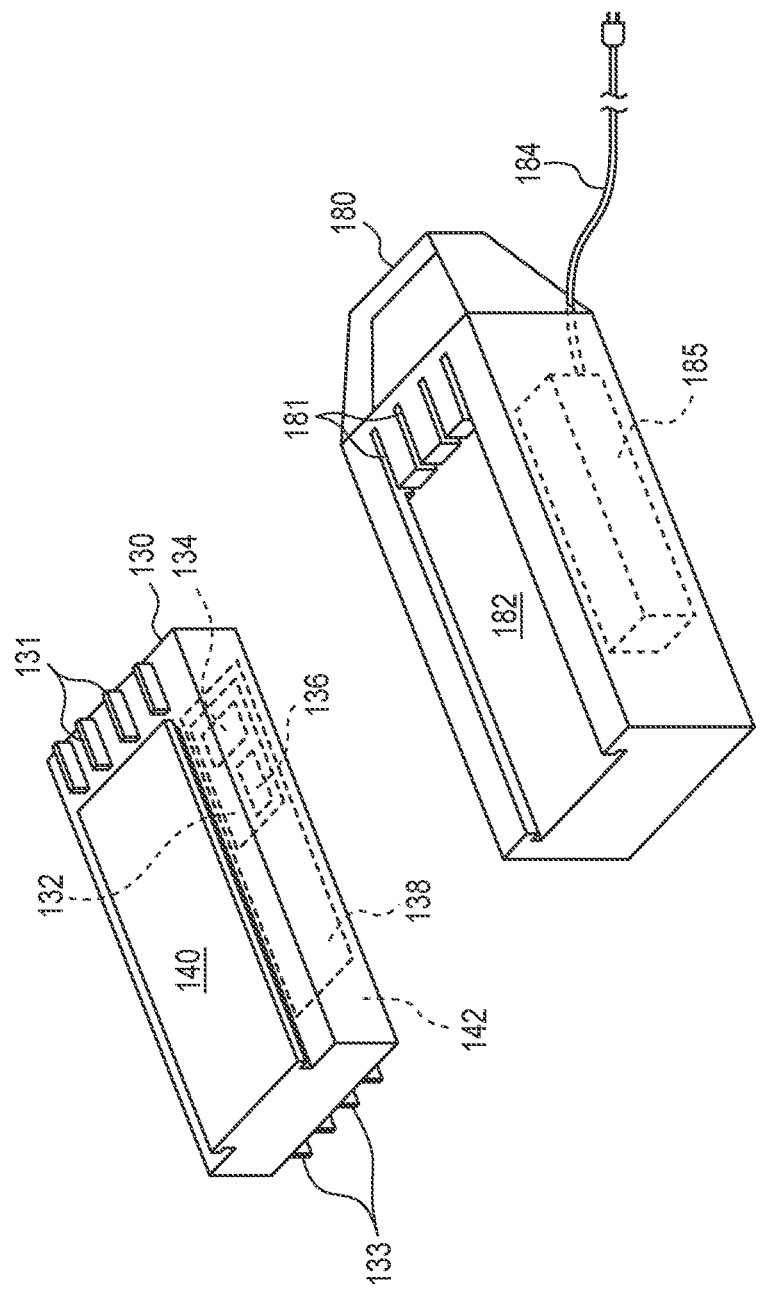
FIG. 4 illustrates an embodiment of a charge adapter, a power adapter, and an interface configuration used in a system in accordance with the present subject matter.
Figure 4A:
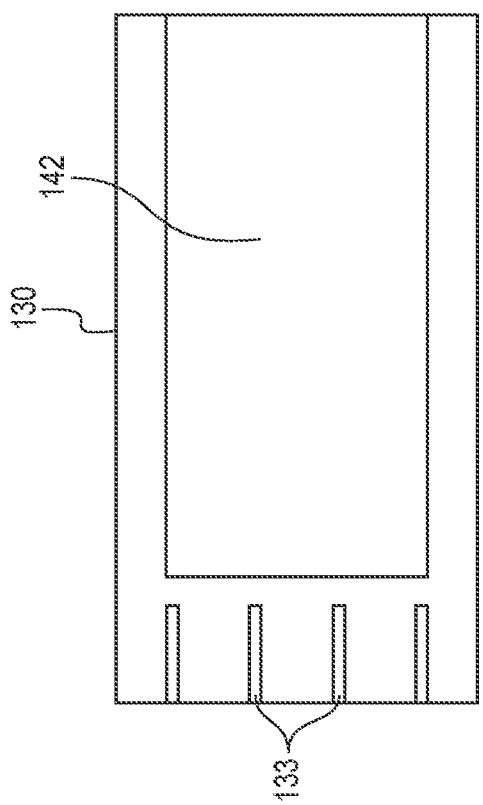
FIG. 4A illustrates a face of the charge adapter illustrated in FIG. 4.

FIG. 4 shows an embodiment of a system including a charge adapter 130 and a power adapter 180. The charge adapter 130 includes a circuit 138 or circuit board (also known as a printed circuit board or PCBA) to receive electrical power such as for example from the power adapter 180 through the interface 142 and deliver the charge current to the battery, such as the battery 120 in FIG. 3, through the interface 140. In certain embodiments, the circuit 138 and/or the charge adapter 130 are configured to receive electrical power from a power source such as power adapter 180 via the interface 142 and deliver electrical power to an electrical power storage component instead of the battery 120 via the interface 140. It is also contemplated that the charge adapter could include circuitry that determines in which direction the power has to be transferred, i.e., always from the power supply to the battery. In these versions of the charge adapter, it would not matter which interface the power supply and battery are connected to (both charge adapter interfaces could be identical). And so, in such versions of the charge adapter, the adapter includes a circuit to receive electrical power from one of the interfaces, and deliver electrical power via the other of the interfaces. In certain versions, the power adapter 180 is configured to engage and electrically connect with either of the interfaces 140 or 142 of the charge adapter 130 provided that the charge adapter 130 includes circuitry and/or controls to direct the flow of electrical power always from the power adapter 180 to the battery 120. In many versions of a charge adapter within the scope of the present subject matter, such as charge adapter 130, the interfaces 140 and 142 are oppositely directed from each other. The circuit 138 includes control circuitry 132 which may include the microprocessor 134 or a microcontroller to monitor the battery voltage, battery current, and/or to provide various battery safety features of the battery such as bypassing the battery if an overload is, in fact, sensed or is sensed as being likely to occur. In certain embodiments, the circuit 138 is a Buck-Boost (also known as Stepdown-Step Up) type charging circuit that converts input voltage from the power adapter 180 to charge the battery, such as battery 120 in FIG. 3. The charge adapter 130 also includes a plurality of contact extensions 131 adjacent the interface 140 to facilitate electrical connection and alignment of interface 140 for proper connection to power adapter 180. And, the charge adapter 130 also includes another plurality of contact extensions 133 as shown in FIG. 4A. The purpose of the contact extensions 131, 133 is to make electrical connection and possibly to also promote engagement with other components as described in greater detail herein. FIG. 4 also illustrates the power adapter 180 and its previously described interface 182. The power adapter 180 also includes a plurality of recesses 181 adjacent the interface 182. The purpose of the recesses 181 is to receive extensions or other members of another component to promote engagement with that component. For example, the recesses 181 are configured to receive the extensions 131 of the charge adapter 130 and enable electrical connection between the power adapter 180 and the charge adapter 130. The power adapter 180 also includes a power cord 184 (FIG. 4) for connecting the power adapter 180 to an electrical power source such as an AC mains outlet (not shown).

In many embodiments, the charge adapter such as the charge adapter 130 is free of a power supply. Upon engagement with and electrical connection to a power adapter such as the power adapter 180, the combined assembly uses a single power supply of the power adapter such as an internal power supply 185 as shown in FIG. 4, to convert AC electrical power such as received from an AC mains power source, to DC power that is provided at or otherwise delivered at an interface of the charge adapter such as the interface 140 of the charge adapter 130.

Figure 5:
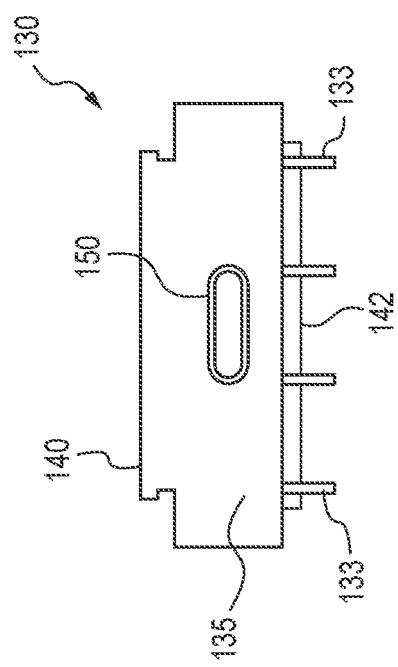
FIG. 5 illustrates an embodiment of a charge adapter with a USB-C port in accordance with the present subject matter.

In many embodiments and as shown in FIG. 5, the charge adapter 130 also includes a USB-C connector 150 for external use. The USB-C connector 150 on the charge adapter 130 provides a power path and can power any conventional device that supports USB-C power delivery. FIG. 5 illustrates an embodiment of a charge adapter with a USB-C connector 150, port, or receptacle accessible along an exterior region on the housing 135. FIG. 5 also depicts, as an end view, oppositely directed interfaces 140 and 142, as an uppermost surface, and plural extensions from the bottom surface, respectively.

The USB-C connector 150 on the charge adapter 130 can in many embodiments deliver up to 100 watts of power even while charging a battery at full charge current. This enables a user to charge a battery and also provide power to electronics or other devices from the power adapter 180 simultaneously. A wide array of devices can be powered by the connector 150 such as smart devices, smart phones, laptops, computers, and tablets, for example.

USB-C (formally known as USB Type-C) is a 24-pin USB connector system. The USB Type-C Specification 1.0 was published by the USB Implementers Forum (USB-IF). It was developed at approximately the same time as the USB 3.1 specification. The USB Type-C Specification was adopted by the IEC as "IEC 62680-1-3". USB-C connectors and cables connect to both hosts and devices, replacing various electrical connectors including USB-B and USB-A, HDMI, DisplayPort and 3.5 mm audio cables and connectors. The 24-pin double-sided connector is slightly larger than the micro-B connector, with a USB-C port measuring 8.4 millimeters (0.33 in) by 2.6 millimeters (0.10 in). Two kinds (genders) of connectors exist, female (receptacle) and male (plug). Plugs are typically found on cables and adapters. Receptacles are typically found on devices and adapters. The present subject matter also includes other types of connectors or ports for providing electrical connection from the charge adapter 130, such as but not limited to USB Type A, USB Type B, USB Mini B, USB Micro B, USB 3.0 Type A, USB 3.0 Type B, USB 3.0 Micro B, USB 3.0 Internal Connector, and USB 3.1 Internal Connector. Furthermore, the present subject matter includes other types of ports and outlets provided on the charge adapter 130, such as but not limited to cylindrical connectors, snap and lock DC power connectors, Molex connectors, connectors according to IEC-60906-3:1994, Tamiya connectors, outdoor lighting system connectors, SAE connectors, car lighter sockets and plugs, ISO 4165 connectors, XLR connectors, Clipsal connectors, and similar connectors.

Figure 6:
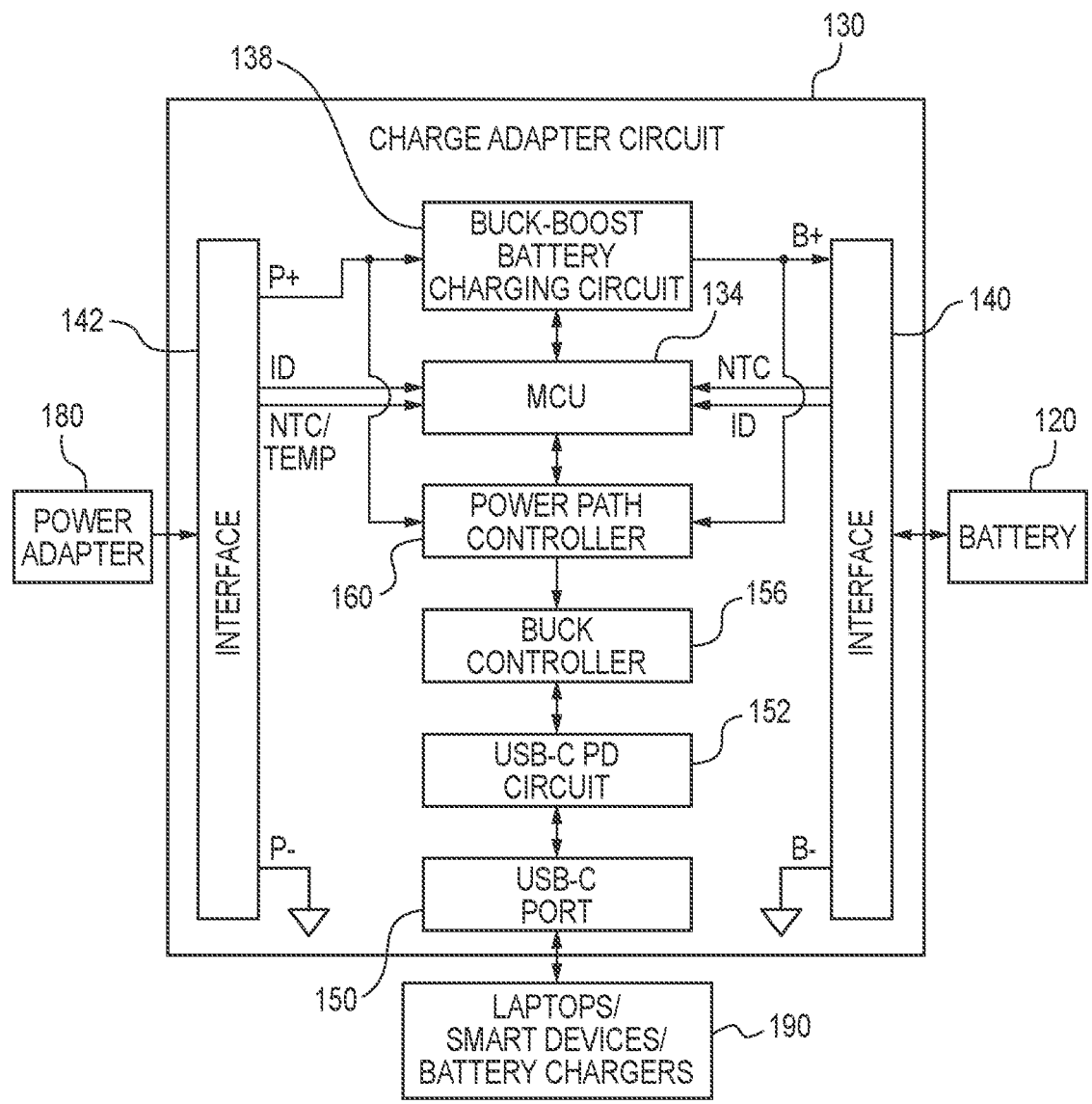
FIG. 6 illustrates an internal circuit schematic of an embodiment of a charge adapter in accordance with the present subject matter.

An internal circuit schematic of an embodiment of a charge adapter 130 is detailed in FIG. 6. Specifically, the charge adapter 130 is shown in electrical connection and/or communication with a battery 120, a power adapter 180, and one or more electronic devices denoted as 190. The battery 120 is in electrical connection with the charge adapter 130 via interface 140. The power adapter 180 is in electrical connection with the charge adapter 130 via interface 142. The electronic devices 190 are in electrical connection with the charge adapter 130 via the USB-C port or connector 150. As previously noted, the charge adapter 130 includes a charging circuit 138 that may be in the form of a Buck-Boost type charging circuit. The charge adapter 130 also includes a microprocessor 134 or microcontroller. The charge adapter 130 also includes a USB-C circuit 152 for controlling power output to the USB-C connector 150. The charge adapter 130 also includes a Buck controller 156 for converting high voltage from the battery to lower voltage required for the USB-C circuit 152. The charge adapter 130 also includes a power path controller 160 for turning ON and OFF the power to the USB-C connector 150.

Figure 7:
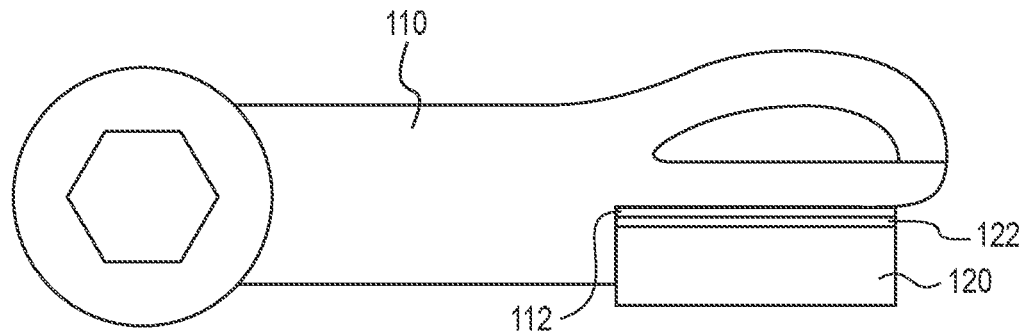
FIG. 7 illustrates an embodiment of a power tool in electrical connection with a battery in accordance with the present subject matter.

FIG. 7 illustrates an embodiment of a power tool in electrical connection with a battery in accordance with the present subject matter. Specifically, FIG. 7 illustrates the tool 110 engaged and in electrical connection with the battery 120 via the interface 112 of the tool 110 and the interface 122 of the battery 120. As will be understood, in this configuration the tool 110 is powered by the battery 120.

Figure 8:
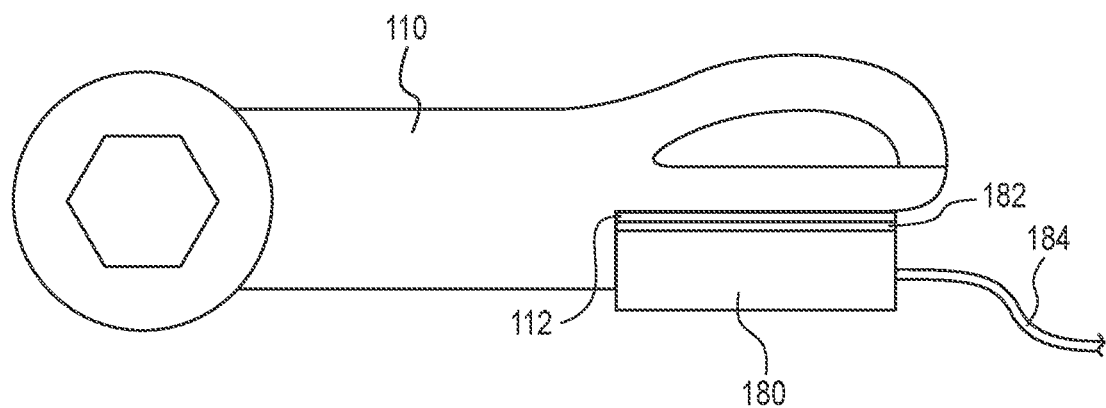
FIG. 8 illustrates an embodiment of a power tool in electrical connection with a power adapter in accordance with the present subject matter.

FIG. 8 illustrates an embodiment of a power tool in electrical connection with a power adapter in accordance with the present subject matter. Specifically, FIG. 8 illustrates the tool 110 (shown in FIG. 7) engaged and in electrical connection with the power adapter 180 via the interface 112 of the tool 110 and the interface 182 of the power adapter 180. As will be understood, in this configuration the tool 110 is powered by the power adapter 180. The power adapter 180 can be electrically connected to an AC power source by the power cord 184.

Figure 9:
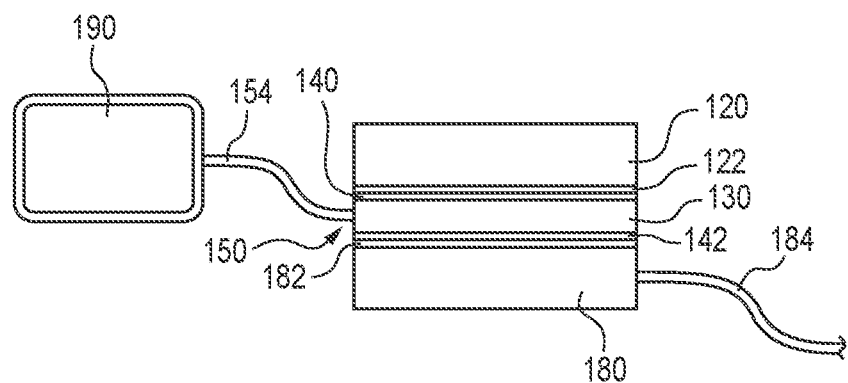
FIG. 9 illustrates an embodiment of a battery, a power adapter, and an electronic device, all in electrical connection with a charge adapter in accordance with the present subject matter.

FIG. 9 illustrates an embodiment of a battery, a power adapter, and an electronic device, all in electrical connection with a charge adapter in accordance with the present subject matter. Specifically, FIG. 9 depicts the battery 120, the power adapter 180, an electronic device 190, all in electrical connection with the charge adapter 130. The battery 120 is engaged and in electrical connection with the charge adapter 130 via the battery interface 122 and the interface 140 of the charge adapter 130. The power adapter 180 is engaged and in electrical connection with the charge adapter 130 via the interface 182 of the power adapter 180 and the interface 142 of the charge adapter 130. The electronic device 190 is in electrical connection with the charge adapter 130 via a power cord 154 and the USB-C connector 150. The power adapter 180 can be electrically connected to an AC power source by the power cord 184.

Figure 10:
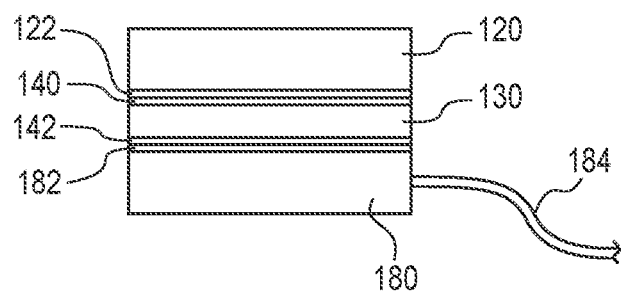
FIG. 10 illustrates an embodiment of a battery and a power adapter in electrical connection with a charge adapter in accordance with the present subject matter.

FIG. 10 illustrates an embodiment of a battery and a power adapter in electrical connection with a charge adapter in accordance with the present subject matter. Specifically, FIG. 10 illustrates the battery 120, and the power adapter 180, both in electrical connection with the charge adapter 130. The battery 120 is engaged and in electrical connection with the charge adapter 130 via the battery interface 122 and the interface 140 of the charge adapter 130. The power adapter 180 is engaged and in electrical connection with the charge adapter 130 via the interface 182 of the power adapter and the interface 142 of the charge adapter 130. The power adapter 180 can be electrically connected to an AC power source by the power cord 184.

Figure 11:
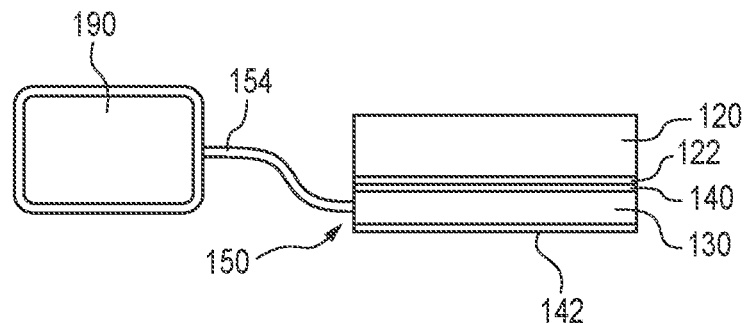
FIG. 11 illustrates an embodiment of a battery and an electronic device in electrical connection with a charge adapter in accordance with the present subject matter.

FIG. 11 illustrates an embodiment of a battery and an electronic device in electrical connection with a charge adapter in accordance with the present subject matter. Specifically, FIG. 11 illustrates the battery 120 and the electronic device 190 in electrical connection with the charge adapter 130. The battery 120 is engaged and in electrical connection with the charge adapter 130 via the interface 122 of the battery 120 and the interface 140 of the charge adapter 130. The electronic device 190 is in electrical connection with the charge adapter 130 via the power cord 154 and the USB-C connector 150.

Figure 12:
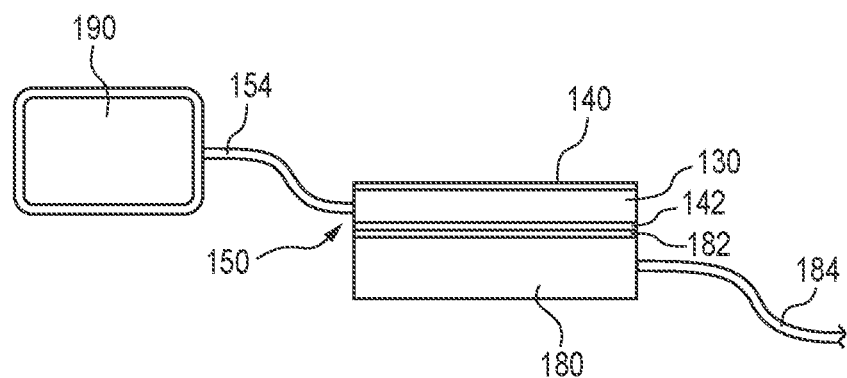
FIG. 12 illustrates an embodiment of a power adapter and an electronic device in electrical connection with a charge adapter in accordance with the present subject matter.

FIG. 12 illustrates an embodiment of a power adapter and an electronic device in electrical connection with a charge adapter in accordance with the present subject matter. Specifically, FIG. 12 illustrates the power adapter 180 and the electronic device 190 in electrical connection with the charge adapter 130. The power adapter 180 is engaged and in electrical connection with the charge adapter 130 via the interface 182 of the power adapter 180 and the interface 142 of the charge adapter 130. The electronic device 190 is in electrical connection with the charge adapter 130 via the power cord 154 and the USB-C connector 150. The power adapter 180 can be electrically connected to an AC power source by the power cord 184.

Figure 13:
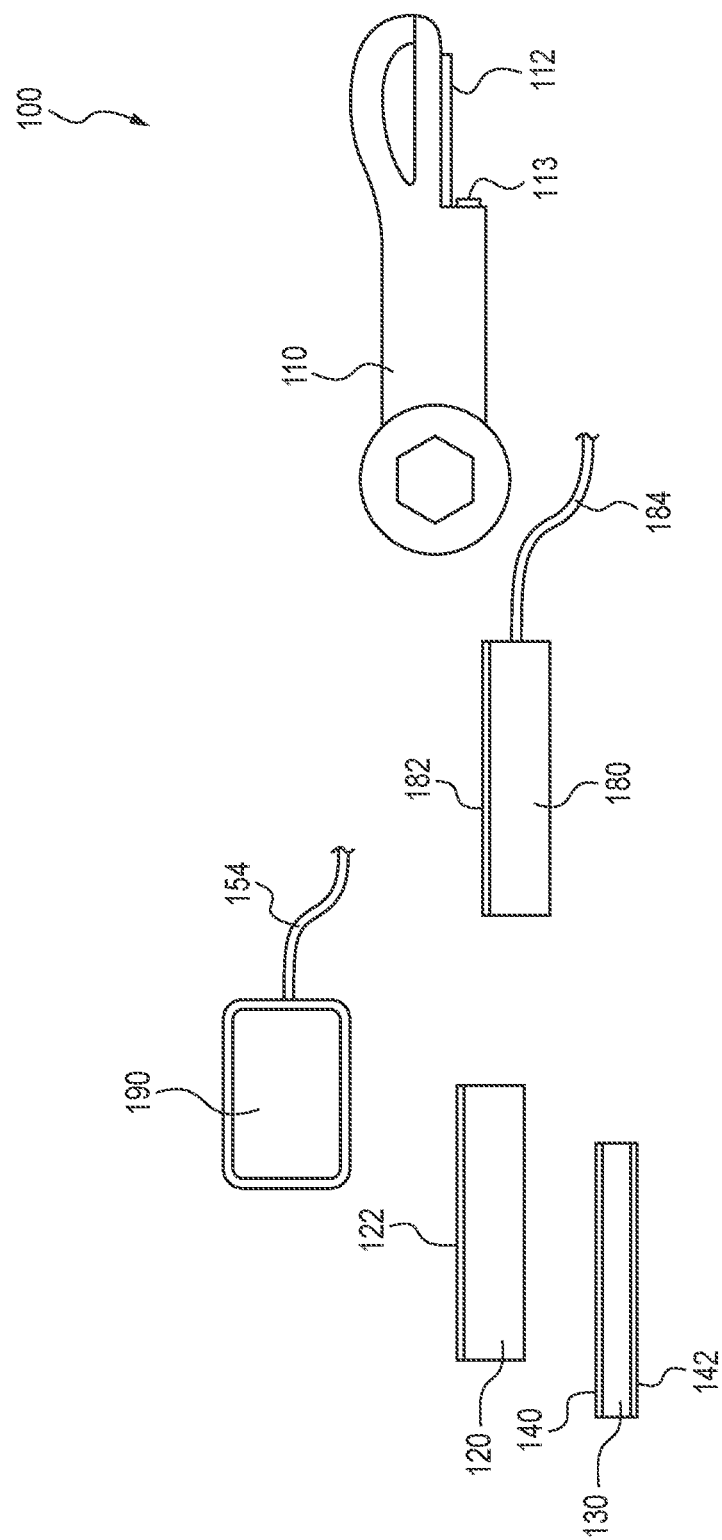
FIG. 13 illustrates an embodiment of a system comprising a power tool, a battery, a charge adapter, a power adapter, and an electronic device in accordance with the present subject matter.

FIG. 13 illustrates a system comprising a power tool, a battery, a charge adapter, a power adapter, and an electronic device in accordance with the present subject matter. Specifically, FIG. 13 depicts a system 100 comprising the power tool 110, the battery 120, the charge adapter 130, the power adapter 180, and the electronic device 190. The components are shown as detached or generally separated from each other. Their interfaces and power cords are as previously described. However, it will be understood that the present subject matter includes arrangements and/or configurations in which one or more of the components are engaged and/or in electrical connection as described herein.

Figure 14:
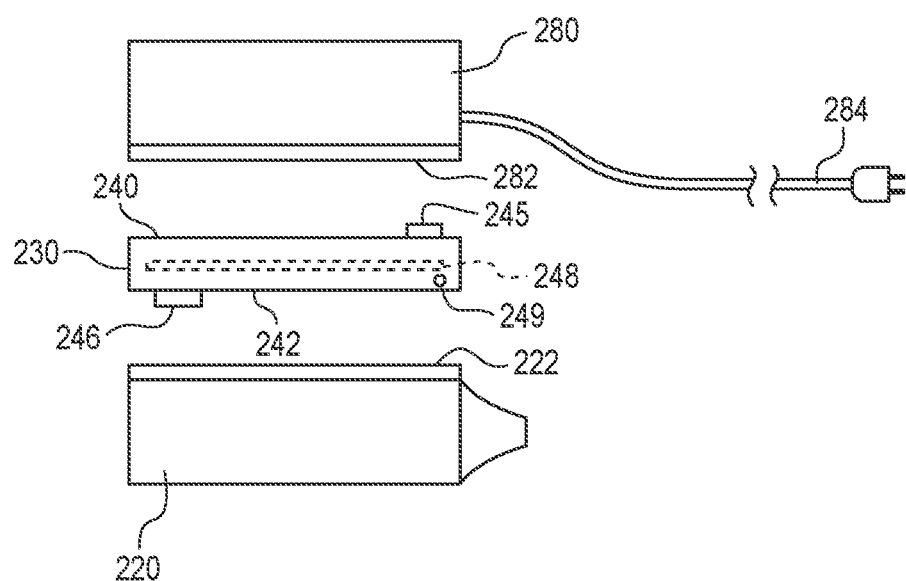
FIG. 14 illustrates another embodiment of a charge adapter, a power adapter, and a battery pack separated from each other in a system in accordance with the present subject matter.
Figure 15:
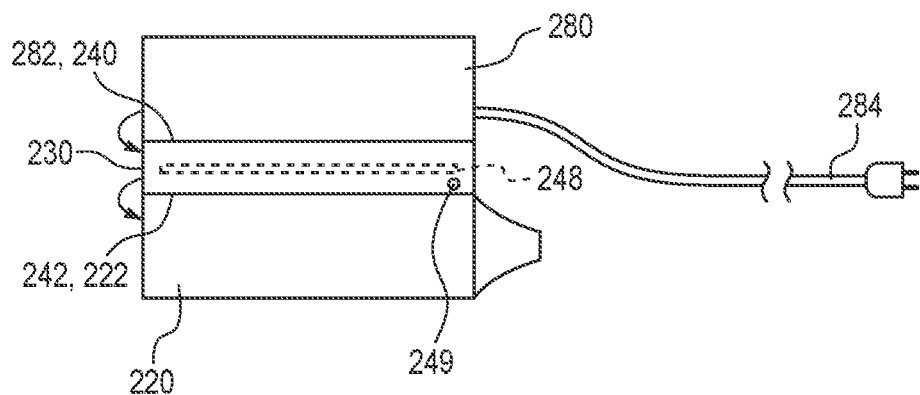
FIG. 15 illustrates the components of FIG. 14 in which the components are connected in a first connection configuration via respective interfaces in accordance with the present subject matter.

FIGS. 14-19 illustrate another embodiment of a charge adapter, a power adapter, a battery pack, an interface configuration, and a related method used in a system in accordance with the present subject matter. Specifically, FIG. 14 illustrates a power adapter 280 having an interface 282, a charge adapter 230 having interfaces 240 and 242, and a battery pack 220 having an interface 222. The charge adapter 230 includes a first extension 245 from interface 240 and a second extension 246 from interface 242, and also includes a controller or printed circuit board assembly 248 and one or more light emitting diodes (LED) or other indicator 249. The indicator 249 indicates operational status of the charge adapter 230 and/or components connected thereto. Typically, the indicator 249 includes provisions to emit light of different colors such as for example red and green, and to emit such light continuously or intermittently, i.e., flash. FIG. 14 illustrates the components 220, 230, and 280 separated from each other. The power adapter 280 can be connected to the charge adapter 230 via the interfaces 282 and 240. The battery pack 220 can be connected to the charge adapter 230 via the interfaces 222 and 242. FIG. 15 illustrates the components of FIG. 14 connected via their respective interfaces. Thus, the power adapter 280 is connected to the charge adapter 230 via the interfaces 282 and 240. The battery pack 220 is connected to the charge adapter 230 via the interfaces 242, 222. Upon connection of the components as shown in FIG. 15, and upon connecting a power cord 284 of the power adapter 280 to a source of AC electrical power, electrical current flows from the power adapter 280 to the charge adapter 230 and from the charge adapter 230 to the battery pack 220. Electrical current from within the charge adapter 230 from the interface 240 to the interface 242, is controlled by the controller or printed circuit board assembly 248. When the battery pack 220 is charging, the indicator or LED 249 is flashing green, or otherwise indicating a battery charging state. FIG. 15 illustrates charging a battery or battery pack with a charge adapter in a first connection configuration in accordance with the present subject matter.

Figure 16:
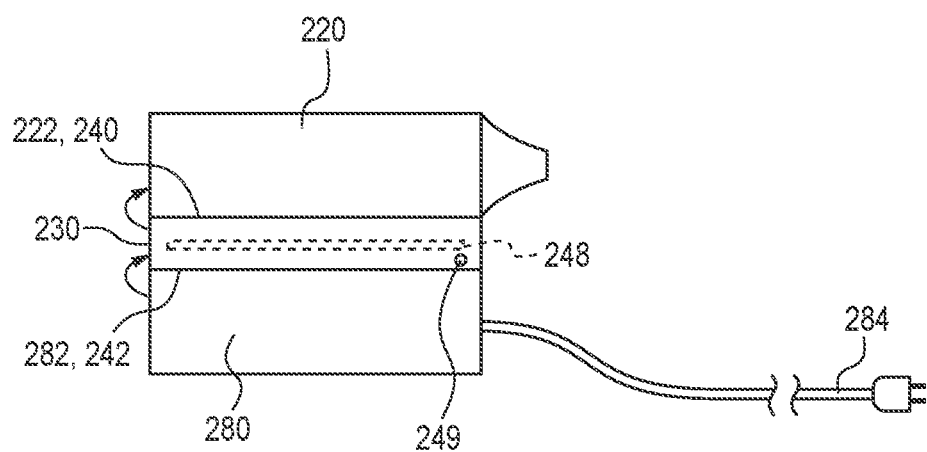
FIG. 16 illustrates the components of FIG. 14 in which the components are connected in a second configuration via respective interfaces in accordance with the present subject matter.

FIG. 16 illustrates charging the battery pack 220 with the charge adapter 230 in a second connection configuration in accordance with the present subject matter. Specifically, FIG. 16 illustrates the battery pack 220 having the interface 222 connected to the interface 240 of the charge adapter 230. FIG. 16 also illustrates the power adapter 280 having the interface 282 connected to the interface 242 of the charge adapter 230. Upon connecting the power cord 284 of the power adapter 280 to a source of AC electrical power, electrical current flows from the power adapter 280 through the charge adapter 230 to the battery pack 220. Electrical current flow through the charge adapter 230 is from the interface 242 to the interface 240, and is controlled by the controller or printed circuit board assembly 248. When the battery pack 220 is charging, the indicator or LED 249 is flashing green or otherwise indicating a battery charging state.

Figure 17:
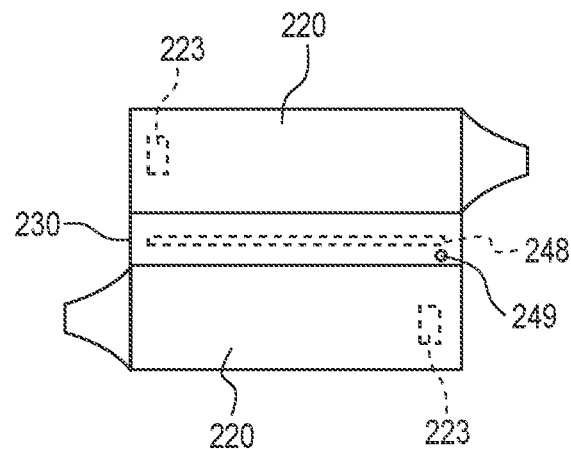
FIG. 17 illustrates the components of FIG. 14 in which the components are connected in a faulty configuration.
Figure 18:
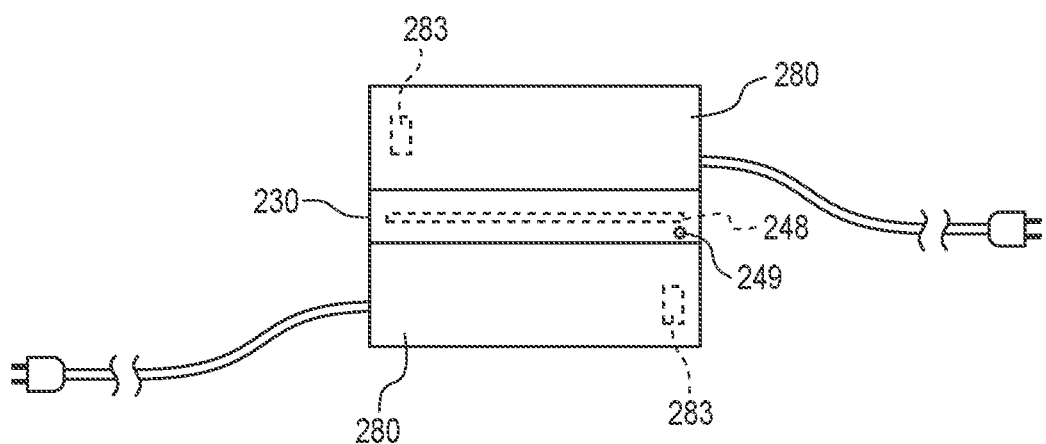
FIG. 18 illustrates the components of FIG. 14 in which the components are connected in another faulty configuration.

FIGS. 17 and 18 illustrate the components depicted in FIG. 14 in faulty connection configurations. Specifically, FIG. 17 illustrates the charge adapter 230 connected to two battery packs 220. FIG. 18 illustrates the charge adapter 230 connected to two AC power adapters 280. The printed circuit board assembly 248 in the charge adapter 230 can detect faulty connections such as the connection configurations shown in FIGS. 17 and 18, by reading identification resistors in the battery pack 220 and the power adapter 280. Although identification resistors are noted, it will be understood that the present subject matter includes a wide array of other components for providing identification, and is not limited to resistors. FIGS. 17 and 18 schematically illustrate a battery pack identification resistor 223 incorporated in the battery pack 220, and a power adapter identification resistor 283 incorporated in the power adapter 280. In the event of a user connecting the components in either of the faulty connection configurations depicted in FIGS. 17 and 18, the controller or printed circuit board assembly 248 directs the LED 249 to flash red or otherwise indicate a faulty connection configuration.

The interfaces 240 and 242 on the charge adapter 230 are the same or substantially the same. The battery pack 220 and the power adapter 280 will physically fit into each interface 240, 242 on the charge adapter 230. When either a battery pack 220 or a power adapter 280 is connected to either interface 240, 242 of the charge adapter 230, the controller or printed circuit board assembly 248 will power up and read the identification resistor 223, 283 in the component(s) 220, 280. If two (2) battery packs 220 or two (2) AC power adapters 280 are connected to the charge adapter 230, the charge adapter 230 will not allow any flow of electrical current but instead will indicate a faulty connection configuration, for example by flashing red or an error code. If one (1) AC power adapter 280 and one (1) battery pack 220 are connected to the two (2) interfaces 240, 242 of the charge adapter 230, the controller or printed circuit board assembly 248 will direct the flow of electrical current from the power adapter 280 to the battery pack 220 and indicate a battery charging state, for example by the LED showing a flashing green light.

During charging, the controller or printed circuit board assembly 248 in the charge adapter 230 will monitor various parameters such as but not limited to battery pack temperature, charge current, and battery pack voltage. During charging, the controller or printed circuit board assembly 248 in the charge adapter 230 will regulate the charge current and/or voltage depending upon the state of charge of the battery pack 220. For example, the controller or printed circuit board assembly 248 will ensure a "CC-CV" charging of a Li-ion battery, and the controller or printed circuit board assembly 248 will limit the charge current to the maximum allowable current for the battery cell(s) in the battery pack 220. The controller or printed circuit board assembly 248 may perform other functions as known for battery management systems. When charging is complete, the controller or printed circuit board assembly 248 will stop the charge current and signal to a user that charging is complete. Such signaling can be performed by the LED 249, for example by the LED showing a continuous green color.

Figure 19:
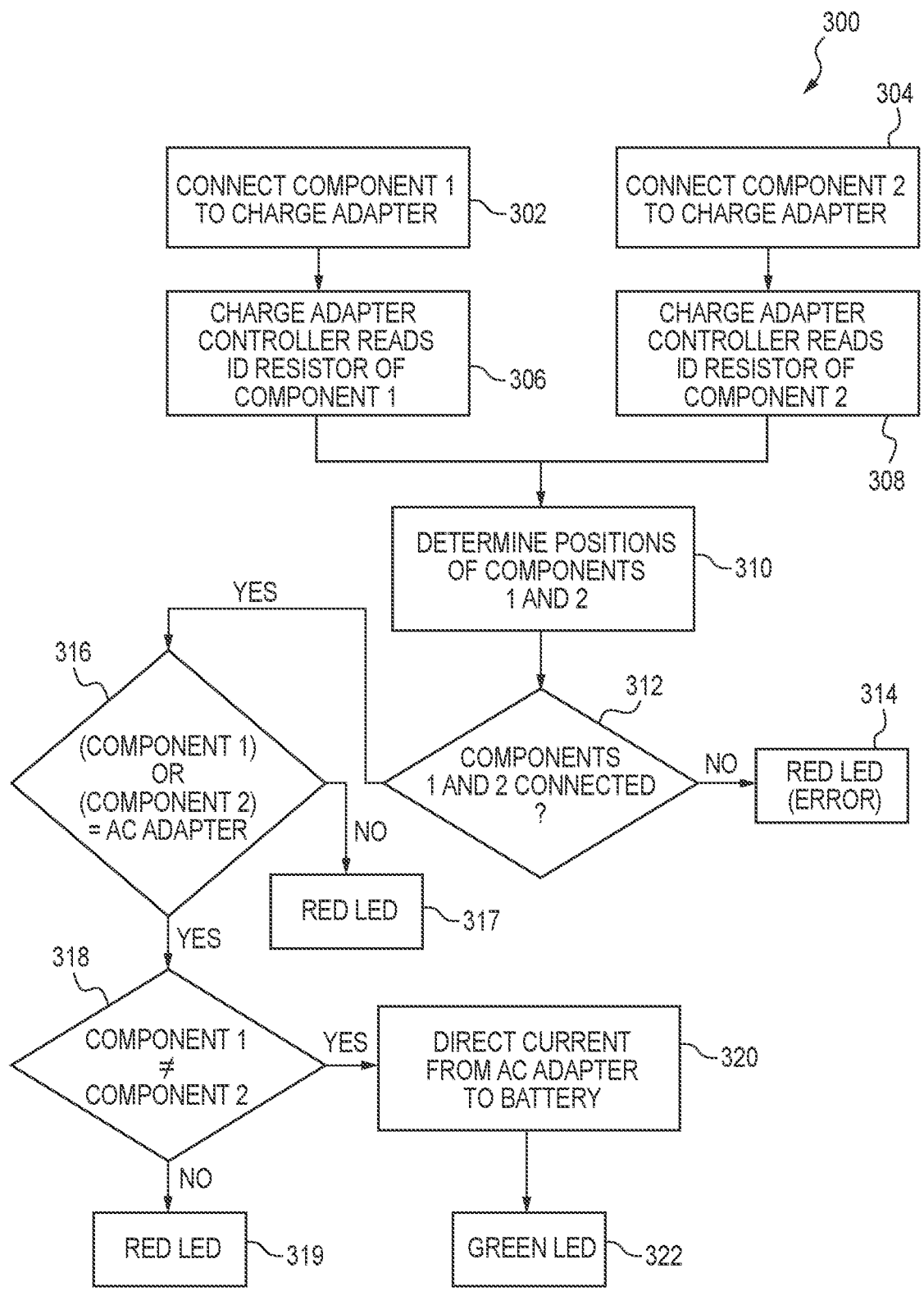
FIG. 19 schematically illustrates an embodiment of a method for charging a battery in accordance with the present subject matter.

FIG. 19 illustrates an embodiment of a method of charging a battery in accordance with the present subject matter. Specifically, the method 300 comprises an operation 302 in which a first component such as a battery or battery pack, or a power adapter is connected to a charge adapter. The method 300 also comprises another operation 304 in which a second component such as a battery or battery pack, or a power adapter is connected to the charge adapter. As previously described herein, if the first component is a battery or battery pack, then the second component should be the power adapter, and vice-versa. The method 300 also comprises an operation 306 in which the charge adapter controller reads an identification resistor in or otherwise associated with the first component. And the method 300 comprises an operation 308 in which the charge adapter controller reads an identification resistor in or otherwise associated with the second component. Using the information from operations 306 and 308, the method comprises an operation 310 in which the connections and/or positions of the first and the second components relative to the charge adapter are determined. In operation 312, a determination is made as to whether the first and second components, i.e., the battery or battery pack, and the power adapter, are properly connected to the charge adapter. In particular versions, operations 310 and/or 312 are performed by the charge adapter reading identification resistor(s) in the battery and/or the power adapter. If the components are properly connected, the method proceeds to operation 316. If the components are not properly connected, the method proceeds to operation 314 in which a red LED or other error state is indicated by the charge adapter. In operation 316, determination is made that one of the components is an AC adapter. If so, the method proceeds to operation 318. If the determination in operation 316 fails, a red LED or other error state is indicated in operation 317. In operation 318, determination is made that the components are not identical. If dissimilarity is determined, the method proceeds to operation 320. In operation 320, electrical DC power is delivered from the AC power converter to the battery. While performing operation 320, the method also performs operation 322 in which a green LED or other indicator is provided to indicate a charge state. If the determination in operation 318 is that the components are not dissimilar, i.e., identical or of the same type, then a red LED or other error state is indicated in operation 319.

As previously described, in certain versions, the charge adapter includes circuitry that controls and/or directs the flow of electrical power from the power adapter to the battery. In these and related versions, circuitry is provided that reverses, or allows selective reversal of, the flow of electrical power. Such reversal can be performed upon detection for example, of an identification pin or other identification member for a power supply or a battery. For example, an identification pin could be in the form of an electrical contact having a particular electrical resistance to identify either a power supply or a battery. The circuitry in the charge adapter then controls the flow of electrical power based upon the identification pin. Typically, the charge adapter includes a first interface and a second interface. And the circuitry then allows control of the direction of flow of electrical power between the first interface and the second interface. Typically, the circuitry also includes provisions for detecting an identification pin at the first interface and/or the second interface. It will be understood that the present subject matter includes a wide array of variant configurations of this feature.

A wide array of power tools can be used in the systems of the present subject matter. That is, the representative tool 110 represents a wide array of one or more electrically powered tools. Non-limiting examples of such tools include power drives, shears, grinders including angle grinders, bandsaws, belt sanders, joiners, cutters including tile cutters, chainsaws, circular saws, pipe saws, crushers, disc cutters, disc sanders, drills, radial arm saws, orbital sanders, reciprocating saws, rotary saws, rotary tools, sabre or reciprocating saws, heating devices, trimmers such as hedge trimmers, string trimmers, impact drivers, impact wrenches, hammers, jigsaws, lathes, lawn mowers, leaf blowers, miter saws, multi-tools, nail guns, torque wrenches, power wrenches, string trimmers, table saws, planers such as thickness planers, vacuum cleaners, and routers. It will be understood that the present subject matter is not limited to these tools and may include nearly any tool, industrial or residential tool, work lights, flash lights, and flood lights, and related systems, garden tool, or other device that is electrically powered.

The present subject matter provides a wide array of features and aspects such as a tool system with batteries, a power adapter, and a charge adapter. The present subject matter also provides a charge adapter with two interfaces that are the same or substantially the same to connect to a power adapter and a battery pack simultaneously. This is a key differentiator to conventional adapters. Conventional adapters have different interfaces to be placed between a battery and a tool. In contrast, the charge adapters in accordance with the present subject matter provides two of the same interfaces to be placed between a power adapter and a battery. The present subject matter also provides a charge adapter with two interfaces that are the same or substantially the same on opposite sides of the housing. The present subject matter also provides a charge adapter with control circuitry and a microprocessor, and the capability to connect the power supply on either interface of the charge adapter. Another distinctive feature is that the charge adapter houses the charging circuitry, but not the power supply circuitry. The present subject matter also provides a charge adapter with control circuitry and a microprocessor, and free of an AC-DC power supply. The present subject matter also provides a dual charger unit that provides a charger for charging a power tool battery and another charger for charging ancillary devices such as smart devices. The present subject matter also provides a charger with USB-C output capability.

One advantage of the present subject matter system is greater flexibility at a reduced cost. The user has flexibility to use his/her tools in corded or in cordless modes. This is of particular advantage for users who may not always have convenient access to AC power, such as in many outdoor use applications, but in other situations require tool use for an extended period of time, for example in drain cleaning applications. These users often do not have an option to recharge their battery throughout the work day, for example due to requirements of several jobs in different locations, as with a professional service plumber.

Figure 1:
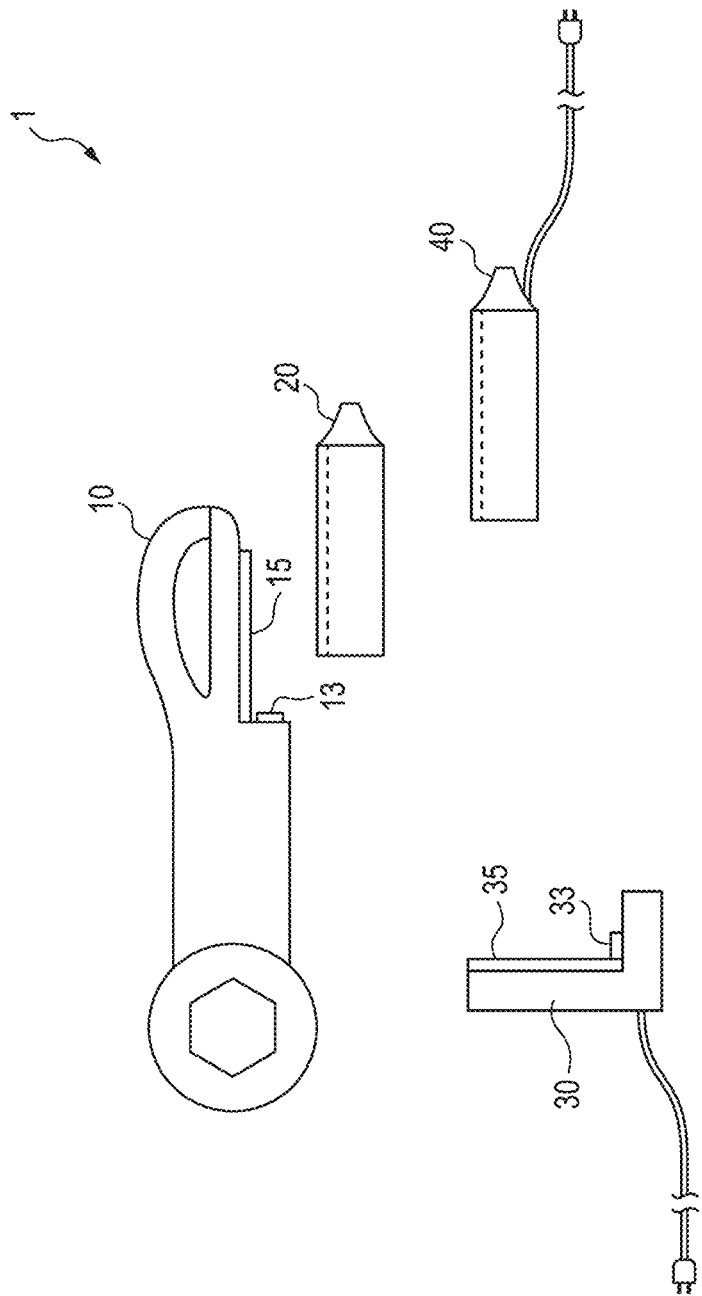
FIG. 1 is a schematic illustration of a known power tool system.
Figure 2:
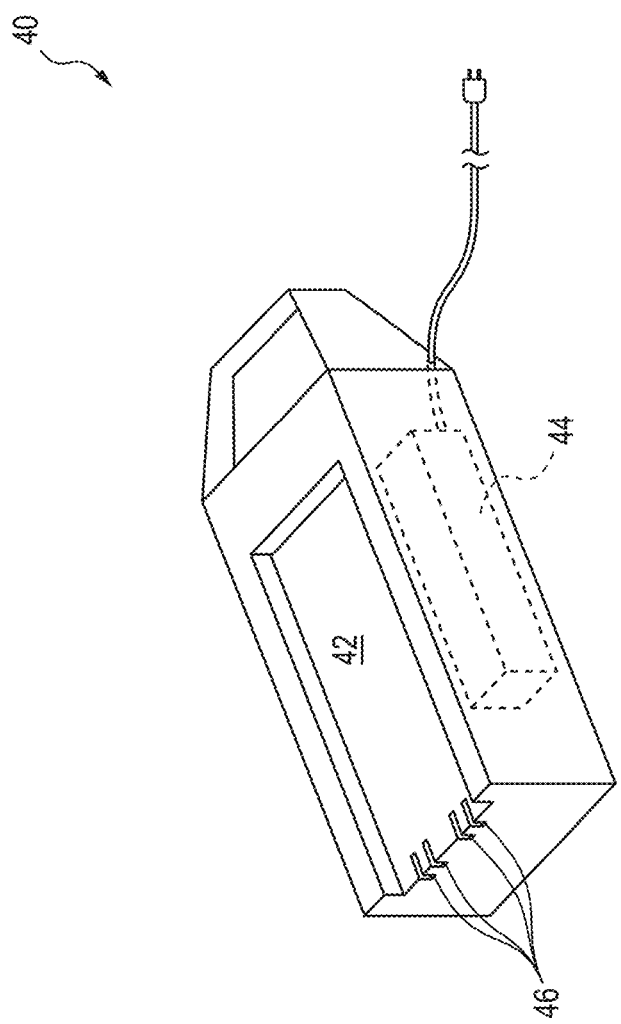
FIG. 2 is a schematic illustration of a known AC power adapter.

In many applications, a better cost position results from using the same power supply for battery charging and for extended use in AC mode. Instead of two power supplies, as shown in FIG. 1 for example, the present subject matter tool system requires only one power supply.

The present subject matter system also has a logistics advantage. The charge adapter is independent of globally different AC mains standards, therefore the same physical component(s) can be used in all markets. The power adapter can also be independent from different AC mains standards. To use the product in different markets, it then only requires a different power cord with a different plug to fit the different outlets.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A system for charging a battery, the system comprising:
   a charge adapter including an interface for engagement and electrical connection with the battery;
   a power adapter releasably separable from the charge adapter, the power adapter including provisions to electrically connect the power adapter to the charge adapter, and a power supply for converting an AC electrical power source to DC electrical power;
   wherein the charge adapter includes control circuitry to control the charging of the battery.

2. The system of claim 1 wherein the interface of the charge adapter is a first interface and the charge adapter includes a second interface, and the power adapter includes an interface configured to engage and electrically connect with the second interface of the charge adapter.

3. The system of claim 2 wherein the power adapter is configured to engage and electrically connect with either of the first interface of the charge adapter or the second interface of the charge adapter.

4. The system of claim 2 wherein the first interface and the second interface of the charge adapter are oppositely directed from each other.

5. The system of claim 2 wherein the charge adapter further includes a circuit to receive electrical power from the second interface and deliver electrical power via the first interface.

6. The system of claim 2, wherein the charge adapter further includes a power supply and a USB-C connector for providing an electrical power supply along an exterior of the charge adapter.

7. The system of claim 1 further comprising:
   a battery releasably separable from the interface of the charge adapter.

8. The system of claim 7 further comprising:
   a powered tool releasably separable from the battery.

9. The system of claim 8 wherein the powered tool is also releasably separable from the power adapter.

10. The system of claim 1 further comprising:
    a powered tool releasably separable from the power adapter.

11. The system of claim 1 wherein the charge adapter further includes an indicator for indicating operational status of the charge adapter.

12. The system of claim 11 wherein the indicator includes at least one light emitting diode (LED).

13. The system of claim 1 wherein the power adapter further includes an identification resistor.

14. The system of claim 7 wherein the battery includes an identification resistor.

15. A system for charging a battery, the system comprising:
    a charge adapter including a first interface for engagement and electrical connection with the battery, and a second interface; and
    at least one of (i) the battery and (ii) a power adapter, wherein the at least one of the battery and the power adapter is releasably separable from the charge adapter via either the first interface or the second interface; wherein both the battery and the power adapter are configured to engage with either of the first interface or the second interface.

16. The system of claim 15 wherein the system comprises the battery and the battery includes an interface for engagement and electrical connection with the charge adapter via the first interface.

17. The system of claim 15 wherein the system comprises the power adapter, which includes an interface for engagement and electrical connection with the charge adapter via the second interface.

18. The system of claim 15 wherein the system comprises both the battery and the power adapter.

19. The system of claim 15 further comprising:
    a tool releasably separable from the battery.

20. The system of claim 19 wherein the tool is also releasably separable from the power adapter.

21. The system of claim 15 wherein the first interface and the second interface of the charge adapter are oppositely directed from each other.

22. The system of claim 15 wherein the charge adapter further includes a USB-C connector for providing an electrical power supply along an exterior of the charge adapter.

23. The system of claim 15 wherein the charge adapter is free of a power supply.

24. The system of claim 15 wherein the charge adapter further includes an indicator for indicating operational status of the charge adapter.

25. The system of claim 16 wherein the battery further includes an identification resistor.

26. The system of claim 17 wherein the power adapter further includes an identification resistor.

27. A powered tool system comprising:
    an electrically powered tool including an interface for engagement and electrical connection with at least one of (i) a battery and (ii) a power adapter, wherein the at least one of the battery and the power adapter is releasably separable from the tool; and
    a charge adapter including a first interface and a second interface for engagement and electrical connection with the battery, wherein each of the battery and the power adapter is releasably separable from the charge adapter via either the first interface or the second interface; wherein each of the battery and the power adapter is configured to engage with either of the first interface or the second interface.

28. The tool system of claim 27 wherein the charge adapter further includes a second interface for engagement and electrical connection with the power adapter.

29. The tool system of claim 28 wherein the first interface and the second interface are oppositely directed from each other.

30. The tool system of claim 27 wherein the charge adapter further includes a USB-C connector for providing an electrical power supply along an exterior of the charge adapter.

31. The tool system of claim 27 wherein the charge adapter is free of a power supply.

32. The tool system of claim 27 further comprising:
    a battery releasably separable from the interface of the tool.

33. The tool system of claim 27 further comprising:
    a power adapter releasably separable from the interface of the tool.

* * * * *